United States Patent
Stec et al.

(10) Patent No.: US 10,336,210 B2
(45) Date of Patent: Jul. 2, 2019

(54) SELECTION OF RANGE FOR AN ELECTRIC DEVICE HAVING A RECHARGEABLE ENERGY STORAGE UNIT

(71) Applicant: GM GLOBAL TECHNOLOGY OPERATIONS LLC, Detroit, MI (US)

(72) Inventors: Jonathan J. Stec, Milford, MI (US); Matthew S. Stout, Hartland, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 170 days.

(21) Appl. No.: 15/677,638

(22) Filed: Aug. 15, 2017

(65) Prior Publication Data

US 2019/0054838 A1    Feb. 21, 2019

(51) Int. Cl.
*H02J 7/04* (2006.01)
*B60L 11/18* (2006.01)
*H02J 7/00* (2006.01)

(52) U.S. Cl.
CPC ....... *B60L 11/1862* (2013.01); *B60L 11/1809* (2013.01); *H02J 7/007* (2013.01)

(58) Field of Classification Search
CPC .................................................... Y02E 60/12
USPC ......................................................... 320/162
See application file for complete search history.

(56) References Cited

U.S. PATENT DOCUMENTS

| | | | |
|---|---|---|---|
| 5,548,200 A * | 8/1996 | Nor ....................... | B60L 53/305 320/109 |
| 8,471,520 B2 * | 6/2013 | Coe ........................ | H02J 7/007 320/101 |
| 2005/0035741 A1 * | 2/2005 | Elder .................... | B60L 3/0046 320/116 |
| 2009/0304101 A1 * | 12/2009 | LoPorto ................. | G01D 4/004 375/260 |
| 2011/0224841 A1 * | 9/2011 | Profitt-Brown ........ | B60K 35/00 701/2 |
| 2014/0028255 A1 * | 1/2014 | Brimacombe ...... | B60L 11/1824 320/109 |

* cited by examiner

Primary Examiner — Yalkew Fantu
(74) Attorney, Agent, or Firm — Quinn IP Law

(57) ABSTRACT

Disclosed herein are a system and method of selecting range for an electric device having a rechargeable energy storage unit. The system includes a controller having a processor and tangible, non-transitory memory on which is recorded instructions. A charging unit is configured to charge the rechargeable energy storage unit when plugged to the charging unit. An operator is requested to enter a selected range for the electric device. The controller is configured to determine if the selected range is less than a predetermined maximum range. If the selected range is less than the predetermined maximum range, the selected range is converted to a selected energy consumption based on a driving model of the operator. A target voltage is determined based on the selected energy consumption and predetermined parameters of the charging unit. The rechargeable energy storage unit is charged to the target voltage, via the charging unit.

20 Claims, 2 Drawing Sheets

SELECTION OF RANGE FOR AN ELECTRIC DEVICE HAVING A RECHARGEABLE ENERGY STORAGE UNIT

INTRODUCTION

The present disclosure relates to selection of range for an electric device having a rechargeable energy storage unit. The use of fully electric and partially electric vehicles, such as battery electric vehicles, window extended electric vehicles, hybrid electric vehicles, plug-in hybrid electric vehicles and fuel cell hybrid electric vehicles, has increased over the last few years. Fully and partially electric vehicles generally include an energy storage component, such as a high voltage battery, which requires periodic recharging.

SUMMARY

Disclosed herein are a system and method of selecting range for an electric device having a rechargeable energy storage unit. The system includes a controller having a processor and tangible, non-transitory memory on which is recorded instruction for executing a method. The controller is in communication with an operator interface that is accessible to an operator. A charging unit is selectively connectable to and configured to charge the rechargeable energy storage unit at one or more charging strengths, including a predefined first charging strength. Execution of the instructions by the processor causes the controller to request an operator to enter a selected range for the electric device, via the operator interface.

The controller is configured to determine if the selected range is less than a predetermined maximum range. If the selected range is less than the predetermined maximum range, the selected range is converted to a selected energy consumption based on a driving model of the operator. The controller is configured to determine a target voltage based at least partially on the selected energy consumption and predetermined parameters of the charging unit. The rechargeable energy storage unit is charged to the target voltage at the predefined first charging strength, via the charging unit. The selected range may be displayed on the operator interface when the charging is completed. The controller may be configured to determine an estimated time for charging the rechargeable energy storage unit to the target voltage. The estimated time may be displayed on the operator interface prior to beginning the charging.

If the selected range is at or above the predetermined maximum range, the rechargeable energy storage unit is charged to a maximum voltage based at least partially on the predetermined parameters of the charging unit and the predetermined maximum range, via the charging unit. The predetermined maximum range may be displayed on the operator interface when the charging is completed.

The controller may be configured to obtain one or more modifiers for the selected energy consumption based at least partially on information selected by the operator via the operator interface, including the operator selecting between "mostly highway speed" and "mostly non-highway speed." The charging strengths provided by the charging unit may include a predefined second charging strength, the predefined first charging strength being relatively high and the predefined second charging strength being relatively low. The target voltage in volts (V) may be proportional to a ratio of the selected energy consumption in joules (J), divided by the predefined first charging strength in coulombs (C).

The system may include a plurality of sensors configured to obtain respective data. The sensors may include: a speed sensor, a brake pedal force sensor, an accelerator pedal force sensor, a lateral accelerometer, a longitudinal accelerometer, a roll sensor and a pitch sensor. The controller is programmed to construct the driving model of the operator based at least partially on the respective data. The controller may be configured to store a plurality of statistical models of driving style and match the driving model of the operator with at least one of the plurality of statistical models of driving style.

The above systems and advantages and other systems and advantages of the present disclosure are readily apparent from the following detailed description of the best modes for carrying out the disclosure when taken in connection with the accompanying drawings.

DETAILED DESCRIPTION

Figure 1:
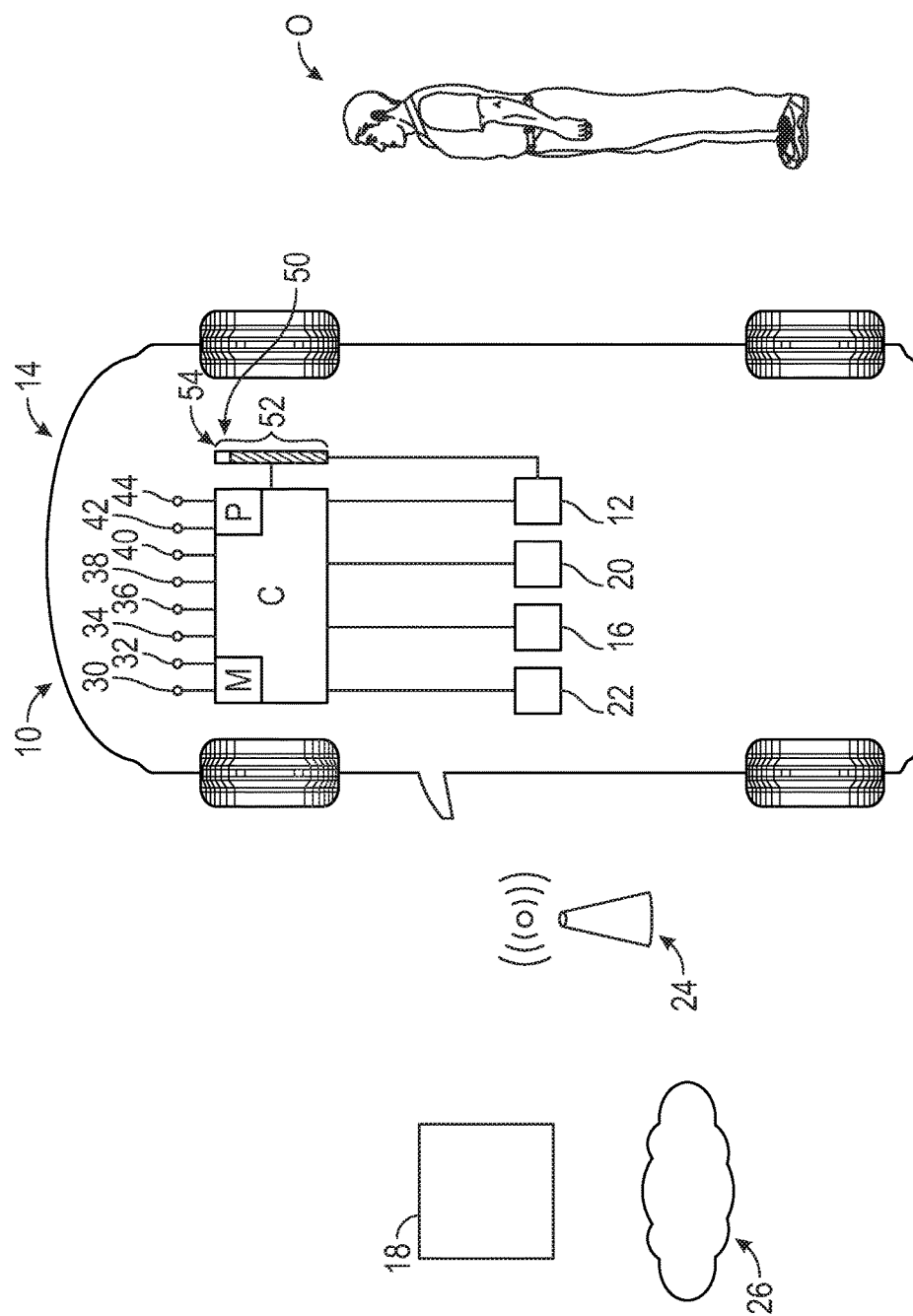
FIG. 1 is a schematic diagram of a system of selecting range for an electric device having a controller.

Referring to the drawings, wherein like reference numbers refer to like components, FIG. 1 schematically illustrates an electric device 10 having a rechargeable energy storage unit 12. The electric device 10 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other transportation electric device. The electric device 10 may take many different forms and include multiple and/or alternate components and facilities.

The rechargeable energy storage unit 12 may include a high voltage battery having a number of battery cells. The battery cells may be of different chemistries, including not limited to, lithium-ion, lithium-iron, nickel metal hydride and lead acid batteries. Described below is a system 14 of selecting range for the rechargeable energy storage unit 12 in the electric device 10. An operator O may see the range of their electric device 10 vary from the sticker number as they drive or operate it. The system 14 allows the operator O to see the same range for their electric device 10 at every instance charging is completed. The operator O may be a passenger or owner of the electric device 10, as well as a company that operates a fleet of electric devices 10. For example, the electric device 10 may be owned and operated by a ridesharing company and the operator O may be an employee of the company.

Referring to FIG. 1, the electric device 10 includes a controller C in communication with the rechargeable energy storage unit 12. The controller C includes at least one processor P and at least one memory M (or non-transitory, tangible computer readable storage medium) on which are recorded instructions for executing a method 100, described below with reference to FIG. 2. The memory M can store controller-executable instruction sets, and the processor P can execute the controller-executable instruction sets stored in the memory M. The electric device 10 may be fully electric or partially electric. For example, the electric device 10 may include an additional power source 16, including but not limited to, an internal combustible engine or fuel cell system.

Referring to FIG. 1, a charging unit 18 is configured to charge the rechargeable energy storage unit (when plugged to the charging unit 18) at one or more charging strengths, including a predefined first charging strength and a predefined second charging strength. The charging unit 18 may be located at a residence, a place of employment or business or other place. The charging unit 18 may be located at a charging station where multiple drivers converge to purchase charging. Referring to FIG. 1, the electric device 10 includes an operator interface 20 in communication with the controller C and accessible to the operator O. The operator O may enter information into the operator interface 20, such as through a touchscreen or keyboard available to those skilled in the art. The operator O may receive information (which may be visual, audible or in another form) from the operator interface 20. The electric device 10 may include a telematics unit 22 configured to communicate with the charging unit 18 via a wireless connection 24 and wireless network 26. For example, the information entered into the operator interface 20 may be communicated to the charging unit 18 through the telematics unit 22.

Referring to FIG. 1, a state of charge (SOC) indicator 50 is in communication with the rechargeable energy storage unit 12 and configured to indicate its state of charge through one or more windows 52. The state of charge refers to the stored charge available to do work relative to that which is available after the rechargeable energy storage unit 12 has been fully charged. The state of charge may be viewed as an assessment of the potential energy of the unit 12. The system 14 allows the operator O to set the range at which the electric device 10 terminates the high voltage or high current charge. In the system 14, the termination point that the controller C uses to stop the charge is determined based on the selected range that the operator O sets instead of being based on a static state of charge set point or cell voltage, stretching out the state of charge and extending the life of the rechargeable energy storage unit 12.

Figure 2:
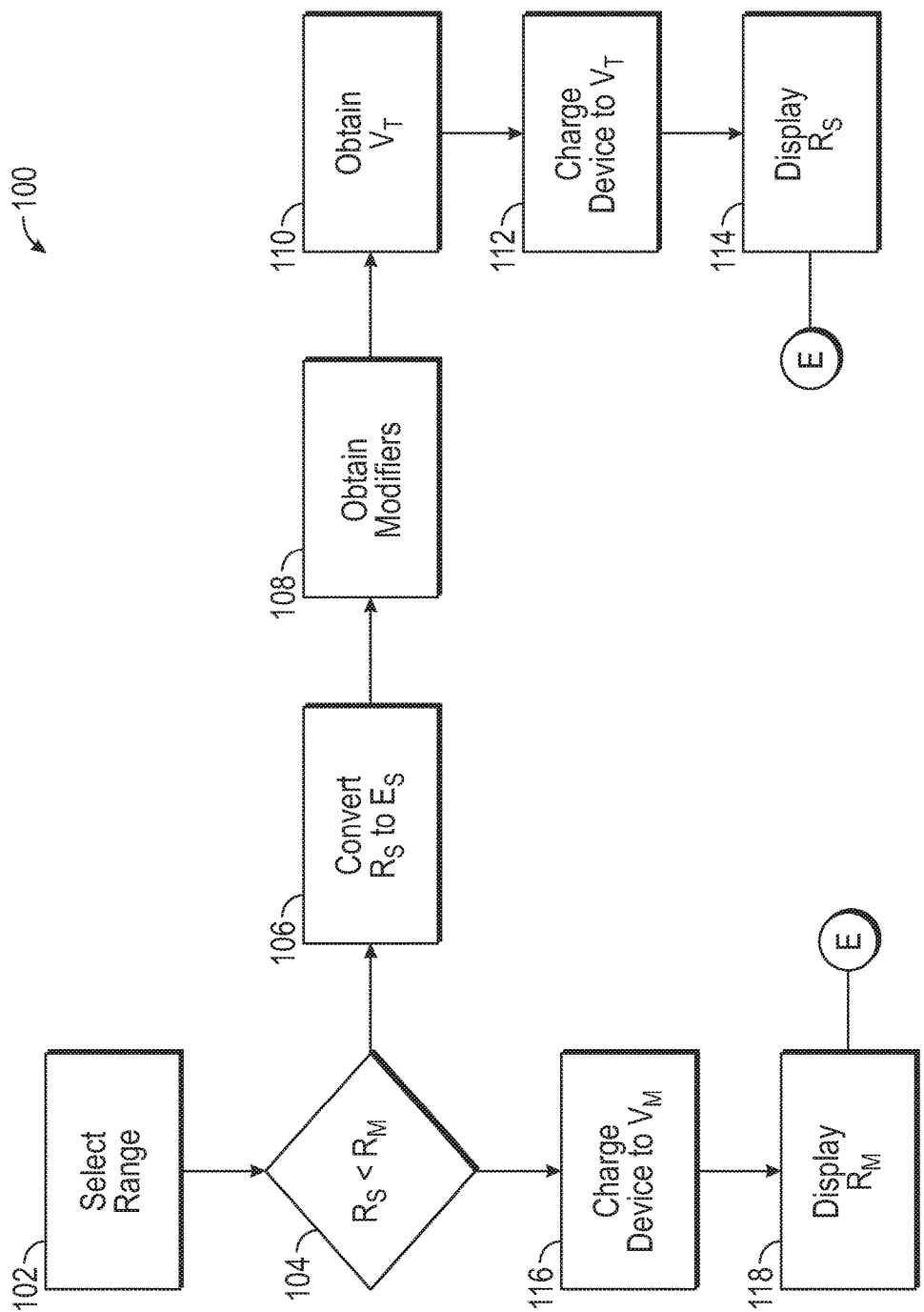
FIG. 2 is a schematic flow diagram of a method executable by the controller of FIG. 1.

Referring now to FIG. 2, a flowchart of the method 100 stored on and executable by the controller C of FIG. 1 is shown. Method 100 need not be applied in the specific order recited herein. Furthermore, it is to be understood that some steps may be eliminated. Referring to FIG. 2, method 100 may begin with block 102, where the controller C is programmed or configured to request the operator O to enter a selected range for the electric device 10, via the operator interface 20.

In block 104 of FIG. 2, the controller C is configured to determine if the selected range ($R_S$ in FIG. 2) is less than a predetermined maximum range ($R_M$ in FIG. 2). The predetermined maximum range may correspond to a state of charge (SOC) set point or maximum state of charge 54 (see FIG. 1). If the selected range is less than the predetermined maximum range, per block 106 of FIG. 2, the controller C is programmed to convert the selected range ($R_S$ in FIG. 2) to a selected energy consumption ($E_S$ in FIG. 2) based at least partially on a driving model of the operator O.

The electric device 10 may include a plurality of sensors in communication (e.g., electronic communication) with the controller C and configured to obtain respective data related to the operation of the electric device 10 and driving traits of the operator O. Referring to FIG. 1, the sensors may include, but are not limited to: a speed sensor 30, brake pedal force sensor 32, accelerator pedal force sensor 34, lateral accelerometer 36, longitudinal accelerometer 38, a steering wheel angle sensor 40, roll sensor 42 and a pitch sensor 44. The respective data may describe driver traits including, but not limited to: degree and frequency of acceleration and braking, steering control, electric device speed relative to a speed limit, frequency of passing and frequency of changing lanes.

The controller C may be programmed to construct the driving model of the operator O based at least partially on the respective data obtained by the plurality of sensors described above. The controller C may be configured to store a plurality of statistical models of driving style available to those skilled in the art. The controller C may be configured to match the driving model of the operator O with at least one of the plurality of statistical models of driving style, i.e., one with the closest correlation. The controller C may be specifically programmed to build and identify statistical models of driving style based on data from a driver database, for example, maintained by a fleet management unit. Additionally, the selected energy consumption ($E_S$ in FIG. 2) may be based on a look-up repository correlating anticipated speed (miles per hour) and a base energy consumption rate (Watt-hour per mile) of the device 10. The look-up repository may be obtained through calibration in a test cell or laboratory.

In block 108 of FIG. 2, the controller C is configured to obtain correction factors, referred to herein as modifiers, for the selected energy consumption. The modifiers may be based on information selected by the operator O on the operator interface 20. For example, the operator O may be requested to select between "mostly highway speed" and "mostly non-highway speed." The operator O may be requested to select between "auxiliary load use" and "no auxiliary load use." If the operator O selects "mostly highway speed", then the controller C may be configured to employ a modifier of 1.05 (5% increase). If the operator O selects "mostly non-highway speed", then the controller C may be configured to employ a modifier of 0.95 (5% decrease). The selected energy consumption may be multiplied by more than one modifier, for example, a first modifier for highway speed and a second modifier for auxiliary load use.

In block 110 of FIG. 2, the controller C is configured to determine a target voltage ($V_T$ in FIG. 2) based at least partially on the selected energy consumption (modified in block 108) and predetermined parameters of the charging unit 18. The charging strengths provided by the charging unit 18 may include a predefined first charging strength and a predefined second charging strength, with the predefined first charging strength being relatively high and the predefined second charging strength being relatively low. In one embodiment, the predefined first charging strength is the maximum charging current provided by the charging unit 18 and the predefined second charging strength is the minimum charging current provided by the charging unit 18. The target voltage in volts (V) may be proportional to a ratio of the selected energy consumption in joules (J), divided by the predefined first charging strength in coulombs (C).

In block 112 of FIG. 2, the rechargeable energy storage unit 12 is charged to the target voltage at the predefined first charging strength, via the charging unit 18. Per block 114 of FIG. 2, the selected range may be displayed on the operator interface 20 when the charging is completed. Additionally, the controller C may be configured to determine an estimated time for charging the rechargeable energy storage unit 12 to the target voltage. The estimated time may be displayed on the operator interface 20 prior to beginning the charging. The system 14 creates a connection between the projected range and time, so the operator O can see exactly how long it will take before they obtain the range they wanted.

If the selected range is at or above the predetermined maximum range, per block 116 of FIG. 2, the controller C is configured to charge the rechargeable energy storage unit 12 to a maximum voltage ($V_M$ in FIG. 2), via the charging unit 18. The maximum voltage is based at least partially on predetermined parameters of the charging unit 18 and the predetermined maximum range. In block 118 of FIG. 2, the predetermined maximum range ($R_M$ in FIG. 2) may be displayed on the operator interface 20 when the charging is completed.

The system 14 attenuates the impact of capacity loss over time the operator O will experience with their rechargeable energy storage unit 12 over the course of years. With the system 14, the electric device range that the operator O has selected will be retained through the electric device 10 extending out the state of charge at which the high charging current is terminated. Accordingly, the system 14 (and execution of the method 100) improves the functioning of the electric device 10.

The flowchart in FIG. 2 illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The controller C of FIG. 1 may be an integral portion of, or a separate module operatively connected to, other controllers of the electric device 10. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing electric device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of selecting range for an electric device having a rechargeable energy storage unit, the system comprising:
 a controller operatively connected to the rechargeable energy storage unit and including a processor and tangible, non-transitory memory on which is recorded instructions for executing a method;
 an operator interface in communication with the controller and accessible to an operator;
 a charging unit selectively connectable to and configured to charge the rechargeable energy storage unit at one or more charging strengths, including a predefined first charging strength;
 wherein execution of the instructions by the processor causes the controller to:
  request an operator to enter a selected range for the electric device on the operator interface;
  determine if the selected range is less than a predetermined maximum range;
  if the selected range is less than the predetermined maximum range, then convert the selected range to a selected energy consumption based on a driving model of the operator;
  determine a target voltage based at least partially on the selected energy consumption and predetermined parameters of the charging unit; and
  charge the rechargeable energy storage unit to the target voltage at the predefined first charging strength, via the charging unit.

2. The system of claim 1, wherein the controller is configured to:
 display the selected range on an operator interface when the charging is completed.

3. The system of claim 1, wherein the controller is configured to:
determine an estimated time for charging the rechargeable energy storage unit to the target voltage; and
display the estimated time on the operator interface prior to beginning the charging.

4. The system of claim 1, wherein if the selected range is at or above the predetermined maximum range, the controller is configured to:
charge the rechargeable energy storage unit to a maximum voltage based at least partially on the predetermined parameters of the charging unit and the predetermined maximum range, via the charging unit; and
display the predetermined maximum range on the operator interface when the charging is completed.

5. The system of claim 1, wherein the controller is configured to:
obtain one or more modifiers for the selected energy consumption based at least partially on information selected by the operator via the operator interface, including the operator selecting between "mostly highway speed" and "mostly non-highway speed".

6. The system of claim 1, wherein:
the one or more charging strengths include a predefined second charging strength, the predefined first charging strength being relatively high and the predefined second charging strength being relatively low; and
the target voltage in volts (V) is proportional to a ratio of the selected energy consumption in joules (J), divided by the predefined first charging strength in coulombs (C).

7. The system of claim 1, further comprising:
a plurality of sensors configured to obtain respective data;
wherein the controller is programmed to construct the driving model of the operator based at least partially on the respective data.

8. The system of claim 7, wherein the plurality of sensors include:
a speed sensor, a brake pedal force sensor, an accelerator pedal force sensor, a lateral accelerometer, a longitudinal accelerometer, a roll sensor and a pitch sensor.

9. The system of claim 7, wherein the controller is configured to:
store a plurality of statistical models of driving style; and
match the driving model of the operator with at least one of the plurality of statistical models of driving style.

10. A method of selecting range for an electric device having a rechargeable energy storage unit and a controller with a processor and tangible, non-transitory memory, the method comprising:
requesting an operator to enter a selected range for the electric device via an operator interface in communication with the controller;
determining if the selected range is less than a predetermined maximum range, via the controller;
if the selected range is less than the predetermined maximum range, then converting the selected range to a selected energy consumption based on a driving model of the operator, via the controller;
determining a target voltage based at least partially on the selected energy consumption and predetermined parameters of the charging unit, via the controller; and
charging the rechargeable energy storage unit to the target voltage at a predefined first charging strength, via a charging unit configured to charge the rechargeable energy storage unit at one or more charging strengths, including the predefined first charging strength.

11. The method of claim 10, further comprising:
displaying the selected range on an operator interface when the charging is completed, via the controller.

12. The method of claim 10, wherein the controller is configured to:
determine an estimated time for charging the rechargeable energy storage unit to the target voltage, via the controller; and
display the estimated time on the operator interface prior to beginning the charging, via the controller.

13. The method of claim 10, further comprising, if the selected range is at or above the predetermined maximum range, then:
charging the rechargeable energy storage unit to a maximum voltage based at least partially on the predetermined parameters of the charging unit and the predetermined maximum range, via the charging unit; and
displaying the predetermined maximum range on the operator interface when the charging is completed, via the controller.

14. The method of claim 10, further comprising:
obtaining one or more modifiers for the selected energy consumption based at least partially on information selected by the operator via the operator interface, including the operator selecting between "mostly highway speed" and "mostly non-highway speed".

15. The method of claim 10, wherein:
the one or more charging strengths include a predefined second charging strength, the predefined first charging strength being relatively high and the predefined second charging strength being relatively low; and
the target voltage in volts (V) is proportional to a ratio of the selected energy consumption in joules (J), divided by the predefined first charging strength in coulombs (C).

16. The method of claim 10, wherein the electric device includes a plurality of sensors configured to obtain respective data, and further comprising:
constructing the driving model of the operator based at least partially on the respective data.

17. The method of claim 16, wherein the plurality of sensors include:
a speed sensor, a brake pedal force sensor, an accelerator pedal force sensor, a lateral accelerometer, a longitudinal accelerometer, a roll sensor and a pitch sensor.

18. The method of claim 17, wherein the controller is configured to:
store a plurality of statistical models of driving style; and
match the driving model of the operator with at least one of the plurality of statistical models of driving style.

19. An electric vehicle comprising:
a rechargeable energy storage unit selectively connectable to a charging unit, the charging unit being configured to charge the rechargeable energy storage unit at one or more charging strengths, including a predefined first charging strength;
a controller operatively connected to the rechargeable energy storage unit and including a processor and tangible, non-transitory memory on which is recorded instructions for executing a method;
an operator interface in communication with the controller and accessible to an operator;
a plurality of sensors configured to obtain respective data, the controller being programmed to construct a driving model of the operator based at least partially on the respective data;

wherein execution of the instructions by the processor causes the controller to:
  request an operator to enter a selected range for the electric device on the operator interface;
  determine if the selected range is less than a predetermined maximum range;
  if the selected range is less than the predetermined maximum range, then convert the selected range to a selected energy consumption based on the driving model of the operator;
  obtain one or more modifiers for the selected energy consumption based at least partially on information selected by the operator via the operator interface, including the operator selecting between "mostly highway speed" and "mostly non-highway speed";
  determine a target voltage based at least partially on the selected energy consumption and predetermined parameters of the charging unit; and
  charge the rechargeable energy storage unit to the target voltage at the predefined first charging strength, via the charging unit.

20. The electric vehicle of claim 19, wherein:
the controller is configured to store a plurality of statistical models of driving style and match the driving model of the operator with at least one of the plurality of statistical models of driving style.

\* \* \* \* \*